United States Patent Office 2,945,841
Patented July 19, 1960

2,945,841
POLYMERS FROM BORIC ACID AND ORGANIC DIISOCYANATES

Robert S. Aries, 41 E. 42nd St., New York 17, N.Y.

No Drawing. Filed July 31, 1957, Ser. No. 675,263

9 Claims. (Cl. 260—77.5)

This invention relates to novel boron-containing polymers and to a method for their manufacture. More particularly, the invention concerns nitrogen-containing boron polymers prepared by the reaction of boric acid with organic di-isocyanates.

Polymers are known which are amide derivatives of boronic acid, such as are described, for example in U.S. Patent 2,517,944. These compounds are prepared from a complicated and costly raw material, and require the presence of a catalyst and a solvent for the reaction, for instance, of an organic boronic acid with a polyisocyanate.

I have now found that novel boron nitrogen polymers having greatly enhanced usefulness and valuable properties may be prepared very simply and directly by the interaction of anhydrous boric acid and an organic di-isocyanate, in accordance with the equation $2H_3BO_3 + 3OCN-R-NCO \rightarrow [B_2(NRN)H_6]_n$ (polymer)

wherein $n$ is an integer denoting the degree of polymerization, and R is an organic radical, such as an aryl, cycloalkyl, or alkyl radical. In general no solvent is required, the reaction taking place between the boric acid and the di-isocyanate in the dry state, but under certain conditions in which better contact is required, the use of a non-reactive solvent or carrier for the reaction may be advisable.

My new process has the further advantage of not requiring a catalyst, but again in some instances, amine type catalysts, such as tertiary amines, may be employed. In general, two moles of boric acid will be reacted with three moles of the di-isocyanate, but it will be understood that variations may be made in this ratio without hindering the course of the reaction. The temperatures required for polymerization are from about 65° C. upward, depending upon the character of the di-isocyanate. For example, if boric acid, $H_3BO_3$, is reacted with tolylene diisocyanate the following partial reaction occurs:

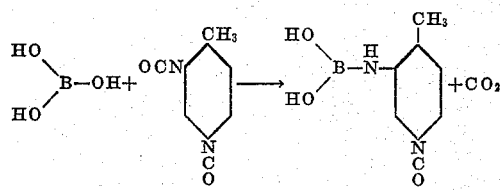

Since boric acid has three reactive —OH groups and the diisocyanate has two reactive groups complete reaction occurs between two moles of boric acid and 3 moles of the diisocyanate. The resultant polymer is not linear (one-dimensional) but spatial (two-dimensional or three dimensional) although the macromolecule may not be planar, but may rather exist as a non-planar surface or may be geometrically even more complicated.

The diagram below represents a small portion of a macromolecule resulting when boric acid and toluene diisocyanate are reacted in the molal ratio of 2:3.

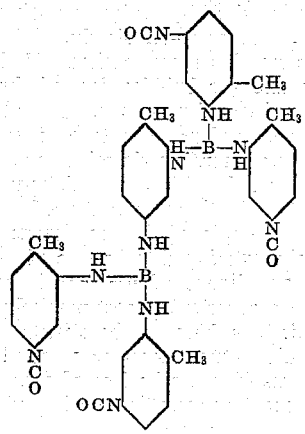

In the above diagram of the 10 —NCO groups present in the 5 original molecules of toluene diisocyanate shown, 6 —NCO groups have reacted with 2 molecules of boric acid so that each of the 3 bonds of the boron atoms is connected directly to nitrogen. The remaining 4 —NCO groups will react with additional —OH groups of boric acid to produce a macromolecule in which there are no free —OH groups and no —NCO groups. For every —NCO group reacting there will be a molecule of $CO_2$ liberated, i.e.

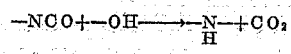

The two bonds of the

will be joined one to a boron atom and the other to the nucleus derived from the original tolylene diisocyanate radical.

When anhydrous boric acid and tolylene diisocyanate are added in the molar ratio of 2:3 at room temperature no reaction occurs. As the temperature is raised slowly reaction occurs vigorously beginning at approximately 90° C. with the liberation of copious amounts of carbon dioxide and the formation of a faintly yellowish white to yellow foamed solid. As the temperature is slowly raised above 90° C. the reaction is terminated when no further $CO_2$ is liberated. The solid is friable, does not melt at the usual temperatures at which polymers ordinarily melt (i.e. up to 300° C.). If the friable polymer mass is broken up with a glass rod and ground finely, the powder so obtained can be compacted to a solid mass by means of pressure, for example, 1000 p.s.i. at 150° C., held for 30 minutes.

The new polymers of the present invention are useful for the production of heat and fire-resistant resinous products, in view of their high melting points. They may also be converted into self-supporting films by pressing or extrusion at elevated temperatures, as well as into molded objects, using in all cases conventional methods.

The aryl, cycloalkyl, or alkyl diisocyanates which may be used in the preparation of the new boron polymers include, for example, tolylene diisocyanate, 3.3'-bitolylene-4.4'-di-isocyanate, diphenylmethane - 4.4' - di-isocyanate, 3.3'-dimethyl diphenyl methane-4.4'-di-isocyanate, hexamethylene di-isocyanate, naphthalene-1.4-di-isocyanate, cyclohexylene-1.2-di-isocyanate, propylene- and butylene di-isocyanates. Examples of amine type catalysts which may be used include N-methyl-morpholine, triethylamine, and dimethylethanolamine.

The invention is illustrated by the following examples, but is not restricted thereto:

*Example 1*

12.37 g. of pure anhydrous boric acid (0.2 mole) and 52.25 grams of toluene diisocyanate (0.3 mole) were placed in a weighed 500 ml. Pyrex flask under a dry nitrogen cover, and warmed slowly. When the temperature in the reaction mass reached 90° C. a vigorous reaction began and gas bubbles formed throughout the mass. The gas liberated was swept from the flask by a current of nitrogen and passed into an absorption tower containing excess of caustic soda solution above that necessary to absorb all the $CO_2$ liberated, assuming it to be 0.6 mole of $CO_2$. Heating was continued to 110° C. for ½ hour when a sample of the gas produced drawn off by a by-pass tube was found to be free of $CO_2$.

Analysis of an aliquot of the caustic soda solution showed it to have absorbed almost precisely 0.6 mole of $CO_2$. Ammonia was found to be absent. The effluent gas from the absorption tower was tested for carbon monoxide and was found to be free of carbon monoxide.

The over-all reaction may thus be formulated as:

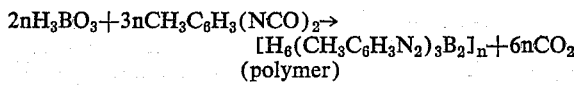
(polymer)

The representation of the polymer in the equation is, of course, the empirical formula for the polymer.

The flask after the reaction was completed was half filled with a yellowish solid similar in appearance to a foamed rubber material. The flask was weighed and was found to contain 38.2 grams of material, corresponding practically precisely to the reaction of Equation 2 based on the raw materials used.

The mass in the flask was crushed with a heavy glass tamping rod and removed with the aid of a spatula. It was possible to remove most of the contents, only a small amount remaining adhering to the glass.

A finely ground sample in a capillary tube did not melt at 300° C., but began to soften at 310° C. Finely ground material subjected to a pressure of 1000 p.s.i. at room temperature gave a mass which could easily be broken up. Finely ground material subjected to a pressure of 1000 p.s.i. at 150° C. for 30 minutes gave a strong solid as determined by manipulation between the fingers.

*Example 2*

When a diisocyanate other than toluene diisocyanate is used in the same molar proportions as already indicated, namely a diisocyanate of the formula OCNRCNO, the reaction is quite analogous and the polymer produced has the same empirical formula. Using 3,3'-bitolylene 4,4'-diisocyanate a softer or rather more flexible polymer is obtained.

*Example 3*

The procedure followed that of Example 1, except that 1% of N-methyl morpholine was added as a catalyst. The reaction began at 70° C. and the polymer formed was more rigid in structure and had greater strength than the polymer of Example 1.

I claim:

1. A method of preparing boron nitrogen polymers which comprises reacting as the sole reactants anhydrous boric acid and a compound of the formula $R(NCO)_2$ wherein R is a hydrocarbon radical, in proportions sufficient to form a spatial nonlinear polymer, at a temperature above about 65° C.

2. A method of preparing boron nitrogen polymers which comprises reacting as the sole reactants anhydrous boric acid and a compound of the formula $R(NCO)_2$ wherein R is a hydrocarbon radical, in molar proportions of 2 to 3 respectively at a temperature above about 65° C.

3. A method of preparing boron nitrogen polymers which comprises reacting as the sole reactants anhydrous boric acid and a compound of the formula $R(NCO)_2$ wherein R is a hydrocarbon radical, in molar proportions of 2 to 3 respectively at a temperature of about 90° C.

4. A method of preparing a boron nitrogen polymer which comprises reacting as the sole reactants anhydrous boric acid and 2.4 tolylene di-isocyanate in molar proportions of 2 to 3 respectively at a temperature of about 90° C.

5. A boron nitrogen polymer prepared by the method of claim 1.

6. A boron nitrogen polymer prepared by the method of claim 2.

7. A boron nitrogen polymer prepared by the method of claim 3.

8. A boron nitrogen polymer prepared by the method of claim 4.

9. A method of preparing boron nitrogen polymers which comprises reacting as the sole reactants anhydrous boric acid and a compound of the formula $R(NCO)_2$ wherein R is a hydrocarbon radical, in molar proportions of 2 to 3 respectively, at a temperature above about 65° C., in presence of an amine catalyst.

References Cited in the file of this patent

UNITED STATES PATENTS

| | | |
|---|---|---|
| 2,282,827 | Rothrock | May 12, 1942 |
| 2,424,883 | Habgood et al. | July 29, 1947 |
| 2,517,944 | Upson | Aug. 8, 1950 |
| 2,597,025 | Orth | May 20, 1952 |
| 2,729,618 | Muller et al. | Jan. 3, 1956 |
| 2,864,780 | Katz et al. | Dec. 16, 1958 |